A. McCORMICK.
AUTOMATIC TOASTER.
APPLICATION FILED MAR. 21, 1919.
1,329,421.
Patented Feb. 3, 1920.
2 SHEETS—SHEET 1.
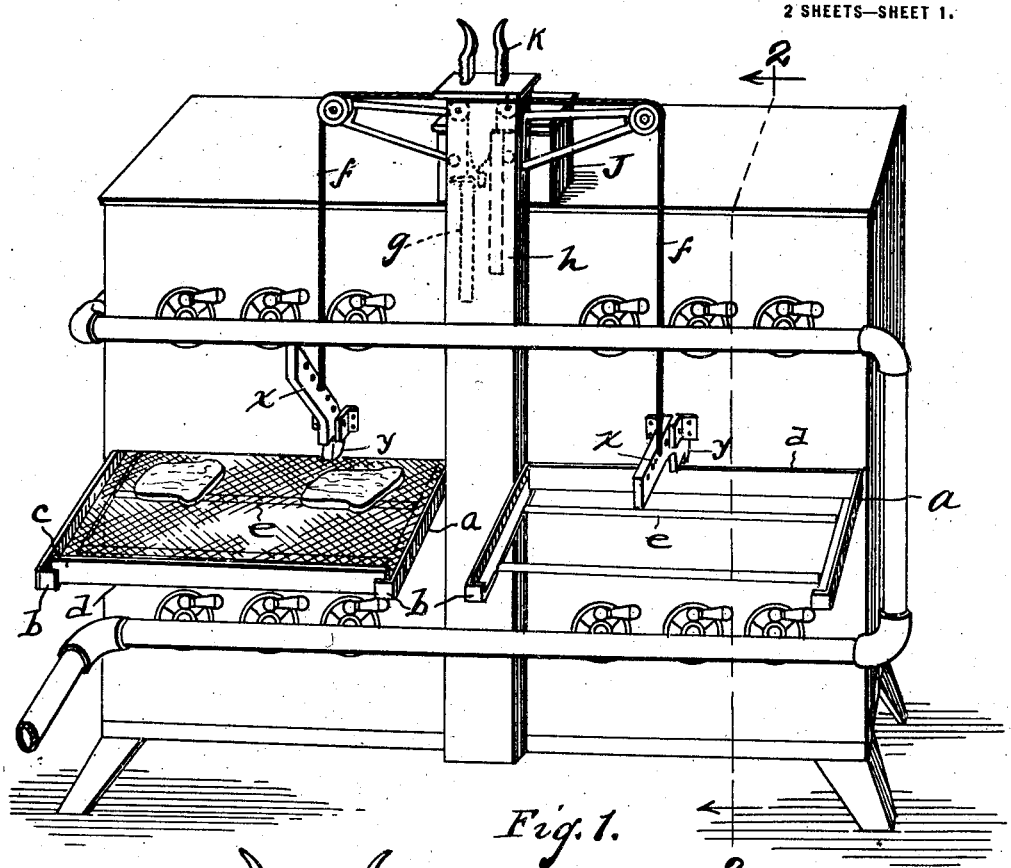
Fig. 1.
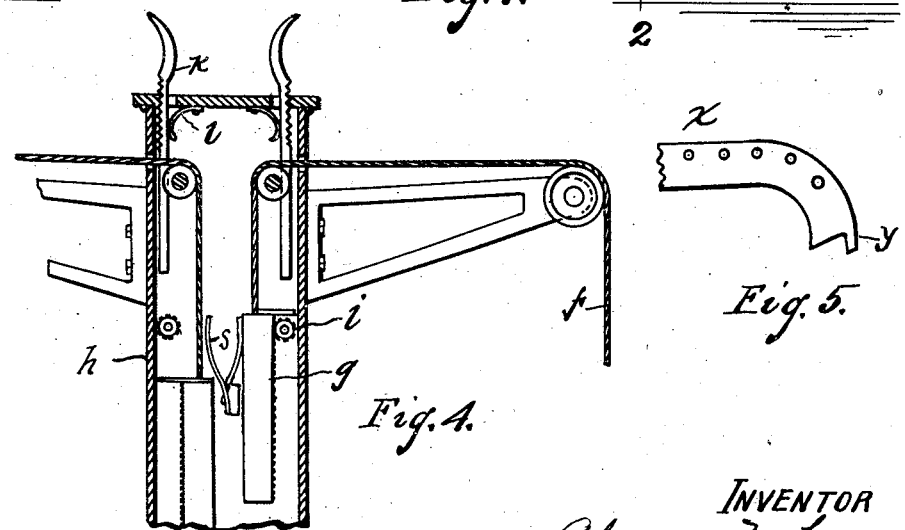
Fig. 4.
Fig. 5.
INVENTOR
Alexander McCormick
BY
Stuart C Barnes
ATTORNEY.

UNITED STATES PATENT OFFICE.

ALEXANDER McCORMICK, OF HIGHLAND PARK, MICHIGAN.

AUTOMATIC TOASTER.

1,329,421.  Specification of Letters Patent.  Patented Feb. 3, 1920.

Application filed March 21, 1919. Serial No. 284,034.

*To all whom it may concern:*

Be it known that I, ALEXANDER McCORMICK, a citizen of the United States, residing at Highland Park, in the county of Wayne, and State of Michigan, have invented certain new and useful Improvements in Automatic Toasters, of which the following is a specification.

This invention relates to automatic toasters, that is, a toasting tray which can be set in a stove and at an appointed time will automatically release itself. Apparatus of this character is very desirable in restaurants where a large amount of toast is made and where the operator may be engaged in other work while the toasting is being done. It dispenses with almost constant attention that must be paid to these toasters if the toast is not to be burned.

It is not broadly new to provide cooking apparatus which at a given time will automatically draw out the article. A good example of apparatus of this kind is the well known egg timers which are in use in large restaurants and hotels. However, these devices all work upon the principle of lifting the eggs vertically out of the water. This is not desirable with toast as toasters cannot very well be operated except with trays that slide in a horizontal or nearly horizontal plane. Hence the apparatus that has heretofore been designed in connection with devices of the egg timer class is not suitable for use in connection with sliding trays for toast.

It has also been suggested in the prior art to use timing mechanisms for releasing latches to allow pans to slide out of an oven but in these devices no provision is made for automatically re-setting the timing mechanism when the next batch is run into the oven.

It is the object of this invention to provide an automatic toaster governed by suitable timing mechanisms which will automatically release itself at a given time and which when shoved back into the oven will automatically re-set the timing mechanism.

In the drawings,—

Figure 1 is a front view of the toasting oven equipped with two trays, one shown projected out and the other in the oven.

Fig. 4 is a fragmentary vertical section through the weight shaft.

Fig. 5 is a detail of the combined latch and resetting lever.

The stove comprises a suitable casing or housing in which are set three, or for that matter any number, of burners above and below the tray for each oven. Each oven is provided with a pair of angle iron guides $a$ which are set at an incline in the oven and in front of the oven where they project out in substantially equal distances to that of their length in the oven. The ends are turned over to form stops $b$. The tray comprises simply a metal frame $c$ equipped with a heavy wire mesh to form a grid. The front of the tray is a bar $d$ adapted to substantially close the tray opening in the oven when the tray is slid in.

It will be seen that both the guides $a$ and the burners are set at somewhat of an angle to the horizontal so that the tray will slide out by gravity when released. To this end the rollers $e$ are provided running from guide-way to guide-way. Of course, equivalent means could be provided, with a horizontal guide-way, such as a spring or a weight, but it is preferable to use the rollers.

Figure 2:
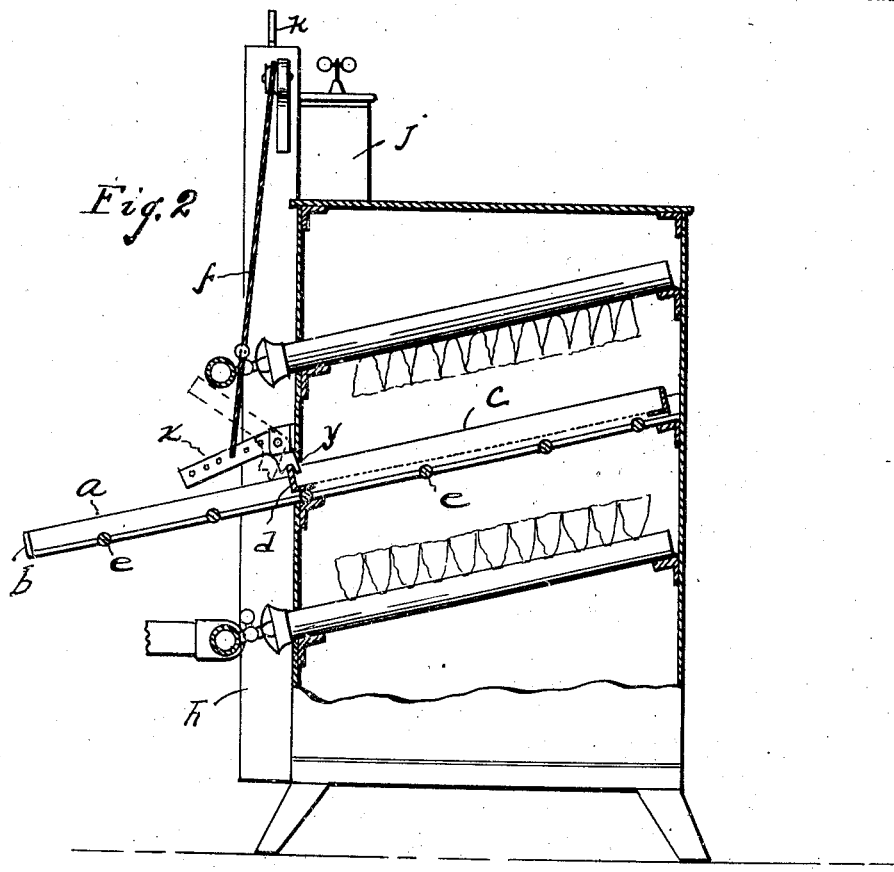
Fig. 2 is a vertical section on the line 2—2 of Fig. 1.
Figure 3:
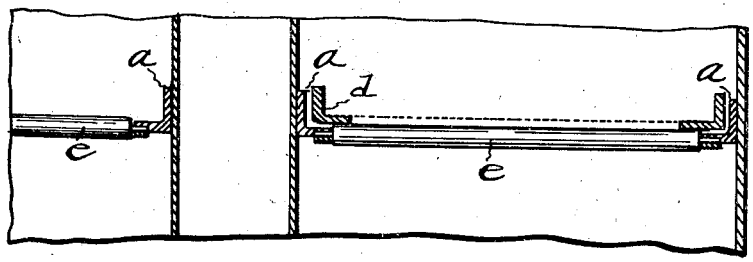
Fig. 3 is a cross section through one of the trays and tray guides.

On the front of each oven pivotally supported by a suitable bracket, is a bell crank arm $x$ provided with a heavy forward arm and a lighter rear arm so the natural disposition of the bell crank arm is that shown in Fig. 2. The smaller arm is provided with a slightly recessed end forming a toe and heel so that when the arm is in the position shown in Fig. 1 it can straddle the upper edge of the bar $d$. The weight of the larger arm of the bell crank lever is great enough so that the potential energy of the tray in its inward position is not sufficient to overcome the adverse leverage of the small arm against which it bears and lift the weight of the large arm. Hence, until something lifts the bell crank arm the tray remains within the oven.

The large or heavy arm of the bell crank lever is connected by a suitable cord $f$ and pulleys with a weight $g$ shown in the shaft $h$. We have not thought it necessary to show the clock mechanism or escapement of the timer. Suffice it to say that such mechanism is old and already in use in egg timers, and the same or a kindred mechanism can be used for this purpose in this automatic toaster. It may be sufficient to say that the weight, for instance, can be a heavy rack meshing with the pinion $i$ which runs back into the housing $j$ in which the clock mechanism or escapement is located. The toothed stop bars $k$ can be let down into the shaft a more or less distance to act as upward limits for the weights $g$ when they are drawn upward. These are held in engagement with the tooth-like edge of the top of the housing by the springs $l$. By adjusting these more or less in and out of the housing, the exact time at which the tray is released can be determined. This will have to be determined more or less by experience as the time when the toast will be nicely browned would depend largely upon the gas pressure and the distance of the burners from the tray. When this has been determined the adjustment may be easily made.

The clockwork or escapement acts in the customary way to require the weight $g$ to always descend at a given rate until it drops off from the pinion $i$, when it is free to drop with its natural speed, completing the pulling up of the bell crank lever $x$ through the cord $f$.

By releasing the tray and allowing the potential energy of its position to carry the toaster out, the lever acts merely as a latch. On the return of the tray the lever takes up a new function as a re-setting lever. On the return of the tray into the oven the bell crank lever $x$ is in the position shown at the left of Fig. 1 and by the dotted lines of Fig. 2. The heel $y$ is still in the path of the bar $d$ and when the tray is shoved in this heel $y$ is picked up by the bar $d$ and the bell crank lever drawn down to the position shown in the full lines of Fig. 2, and with it, of course, the weight $g$ raised in the shaft. Hence the timer is automatically re-set.

A certain amount of adjustment can be made of the stop bars without altering the connection between the cord and the bell crank lever. However, the several holes shown on the bell crank lever $x$ allow the changing of the attachment of the cord $f$ to give more or less movement to the cord for a corresponding throw of the heel of the lever. Referring to Fig. 2, it will be seen that the toe of the lever does not clear the bar $d$ and release the toasting tray $c$ until the bell crank lever $x$ is almost to the top of its throw. Hence this allows the lever to be pulled up some by the slow descent of the weight $g$ without releasing the tray until the rack weight is dropped off from the pinion. When the weight drops off the pinion the lever $x$ is instantly pulled up and the tray released.

As already explained, we have not thought it necessary to illustrate the escapement, which might be varied within considerable limits. As an illustration of the kind of escapement suitable for the purpose, reference is made to United States Patent No. 1,096,250 issued to C. C. Lamb for timing device for egg boilers. The escapement compels the pinion $i$ in turning to let the weight $g$ drop only at a slow determined rate. The teeth of the rack are sloping on their tops so that in pulling the weight up they slip over the teeth of the pinion, the springs $s$ permitting this, and the escapement holds the pinion from turning while the rack weight $g$ is drawn over it upward.

What I claim is:

1. In apparatus for the purpose specified, the combination of a toasting oven, a toasting tray slidable therein and arranged to project outwardly when released, a holding member for holding the tray inward until released, and timing mechanism and connections with the holding member for releasing the holding member at a given time, said holding member being arranged to be struck by the tray when forced in to re-set the timing mechanism.

2. In apparatus for the purpose specified, the combination of a toasting oven, a toasting tray slidable in and out of the oven and arranged to project outwardly from the oven when released, a bell crank lever for holding the tray in the oven, and timing mechanism and connections with the bell crank lever for releasing the bell crank lever to allow the tray to slide out at an appointed time, said bell crank lever being arranged on its return movement to re-set the timing mechanism.

3. In apparatus for the purpose specified, the combination of a toasting oven, a toasting tray slidable therein and arranged to project outwardly when released, a bell crank lever recessed at one end to form a toe and a heel and arranged to engage over the frame of the tray when the tray is in the oven to hold the same in place, and timing mechanism and connections with the bell crank lever, the said timing mechanism being re-set by the heel of the bell crank lever being struck by the tray on the return movement.

In witness whereof I have hereunto set my hand on the 3rd day of March, 1919.

ALEXANDER McCORMICK.